(12) United States Patent
Sharma et al.

(10) Patent No.: US 10,284,473 B1
(45) Date of Patent: May 7, 2019

(54) MULTIFUNCTIONAL NETWORK SWITCH

(71) Applicant: CISCO TECHNOLOGY, INC., San Jose, CA (US)

(72) Inventors: Samar Sharma, San Jose, CA (US); Mouli Vytla, San Jose, CA (US); Rajendra Kumar Thirumurthi, Milpitas, CA (US)

(73) Assignee: Cisco Technology, Inc., San Jose, CA (US)

( * ) Notice: Subject to any disclaimer, the term of this patent is extended or adjusted under 35 U.S.C. 154(b) by 388 days.

(21) Appl. No.: 14/871,507

(22) Filed: Sep. 30, 2015

(51) Int. Cl.
*H04L 12/18* (2006.01)
*H04L 29/06* (2006.01)
*H04L 12/803* (2013.01)
*G06F 15/16* (2006.01)

(52) U.S. Cl.
CPC .......... *H04L 47/125* (2013.01); *H04L 12/185* (2013.01); *H04L 63/0227* (2013.01); *H04L 63/0853* (2013.01); *H04L 65/80* (2013.01)

(58) Field of Classification Search
CPC .............. H04L 47/125; H04L 63/0227; H04L 63/0853; H04L 12/185
USPC .......................................... 709/223, 225, 245
See application file for complete search history.

(56) References Cited

U.S. PATENT DOCUMENTS

| | | | | |
|---|---|---|---|---|
| 2003/0110262 A1* | 6/2003 | Hasan | ................. | H04L 41/0213 709/226 |
| 2008/0274725 A1* | 11/2008 | Tkachenko | ......... | H04L 63/0853 455/420 |
| 2009/0182893 A1* | 7/2009 | Anand | ................. | G06F 12/0831 709/238 |
| 2010/0106842 A1* | 4/2010 | Cosmadopoulos | ..... | H04L 65/80 709/228 |
| 2015/0149635 A1* | 5/2015 | Rajagopalan | ....... | H04L 67/1014 709/226 |
| 2015/0188823 A1* | 7/2015 | Williams | .............. | H04L 47/125 370/235 |

(Continued)

OTHER PUBLICATIONS

Cisco Systems, Inc., "Chapter 5: Configuring Network Address Translation," Security Guide, Cisco ACE Application Control Engine for the Cisco ACE Application Control Engine Module and Cisco ACE 4700 Series Application Control Engine Appliance Software Version A5(1.0), Sep. 2011, 65 pages.

(Continued)

*Primary Examiner* — Emmanuel L Moise
*Assistant Examiner* — Mariegeorges A Henry

(57) ABSTRACT

In accordance with one example embodiment, a system configured for providing multifunctional switching is disclosed. The system is configured for filtering at least some incoming traffic to select network packets originating from one or more predefined sources and destined to a predefined destination, load balancing at least some of the selected network packets among a plurality of server nodes to assign each network packet to one server node of the plurality of server nodes, for each network packet assigned to one server node of the plurality of server nodes replacing a destination address of the predefined destination with a destination address of the assigned server node, and forwarding the each network packet assigned to one server node in accordance with the replaced destination address in the network packet.

20 Claims, 11 Drawing Sheets

(56) References Cited

U.S. PATENT DOCUMENTS

2016/0294935 A1* 10/2016 Hong .................. H04L 47/125

OTHER PUBLICATIONS

Intel Corporation, "Intel® Ethernet Switch Load Balancing System Design-Using Advanced Features in Intel® Ethernet Switch Family," White Paper, Jun. 2008, 12 pages.

APCON, Inc., "IntellaFlex ACI-3288-XR APCON Network Monitoring Switch-Industry Leading High Availability 8RU Chassis With up to 288 Non-Blocking 10G Ethernet Ports," Data Sheet, © 2014 APCON, Inc. All Rights Reserved; 4 pages.

Microsoft, "Network Load Balancing Technical Overview-Operating System," Mar. 2000, 20 pages; https://msdn.microsoft.com/en-us/library/bb742455(d=printer).aspx.

* cited by examiner

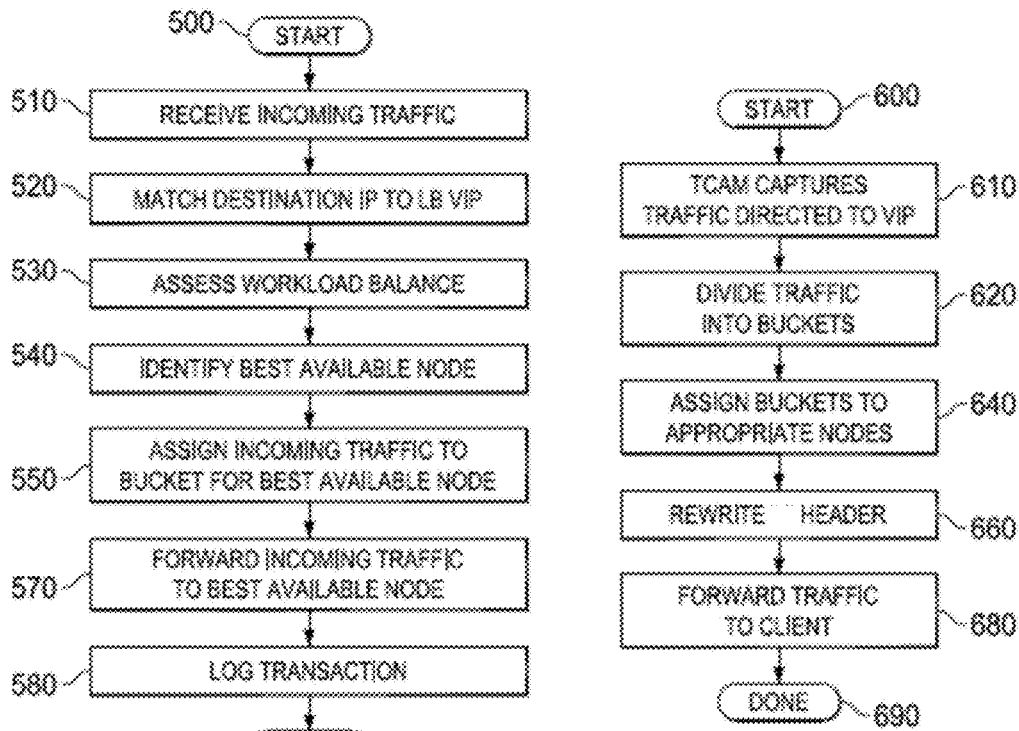

Define ACL switch(config)# ip access list traffic-from-app-servers
switch(config-acl)# permit tcp 10.10.10.10/32 any
switch(config-acl)# permit tcp 10.10.10.20/32 any

FIG. 10A

Apply ACL on interface switch(config)# int e3/1
switch(config-if)# ip access-list traffic-from-app-servers

FIG. 10B

Define Device Group (for backend nodes)

switch(config)# itd device-group DB-SERVERS
switch(config-device-group)# probe icmp
switch(config-device-group)# node ip 20.20.20.2
switch(config-device-group)# node ip 20.20.20.3
switch(config-device-group)# node ip 20.20.20.4
switch(config-device-group)# node ip 20.20.20.5

FIG. 10C

Define Load Distribution Service, specify VIP and NAT policy switch(config)# itd APP-TO-DB
switch(config-itd)# ingress interface e3/1
switch(config-itd)# device-group DB-SERVERS
switch(config-itd)# virtual ip 210.10.10.100 255.255.255.255 advertise enable
switch(config-itd)# nat destination
swtich(config-itd)# no shut

FIG. 10D

MULTIFUNCTIONAL NETWORK SWITCH

TECHNICAL FIELD

This disclosure relates in general to the field of computer networking and, more particularly, to systems, methods, and computer readable mediums for providing a multifunctional switching.

BACKGROUND

Data centers are increasingly used by enterprises for effective collaboration, data storage, and resource management. A typical data center network contains myriad network elements including servers, load balancers, routers, switches, etc. The network connecting the network elements provides secure user access to data center services and an infrastructure for deployment, interconnection, and aggregation of shared resources. Improving operational efficiency and optimizing utilization of resources in data centers are some of the challenges facing data center managers. Data center managers seek a resilient infrastructure that consistently supports diverse applications and services. A properly planned data center network provides application and data integrity and, further, optimizes application availability and performance.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which:

FIG. 4 is a block diagram of a network topology, according to some exemplary embodiments of the present disclosure;

FIG. 5 is a block diagram of a state machine, according to some exemplary embodiments of the present disclosure;

FIG. 6 is a flow chart of a method, according to some exemplary embodiments of the present disclosure;

FIG. 10A is an example command-line interface for defining ACL for the scenario of FIG. 8, according to some exemplary embodiments of the present disclosure;

FIG. 10B is an example command-line interface for applying the ACL on an interface for the scenario of FIG. 8, according to some exemplary embodiments of the present disclosure;

FIG. 10C is an example command-line interface for defining a device group for the scenario of FIG. 8, according to some exemplary embodiments of the present disclosure; and FIG. 10D is an example command-line interface for defining load distribution service and specifying VIP NAT policy for the scenario of FIG. 8, according to some exemplary embodiments of the present disclosure.

DETAILED DESCRIPTION OF EXAMPLE EMBODIMENTS

Overview

Figure 1A:
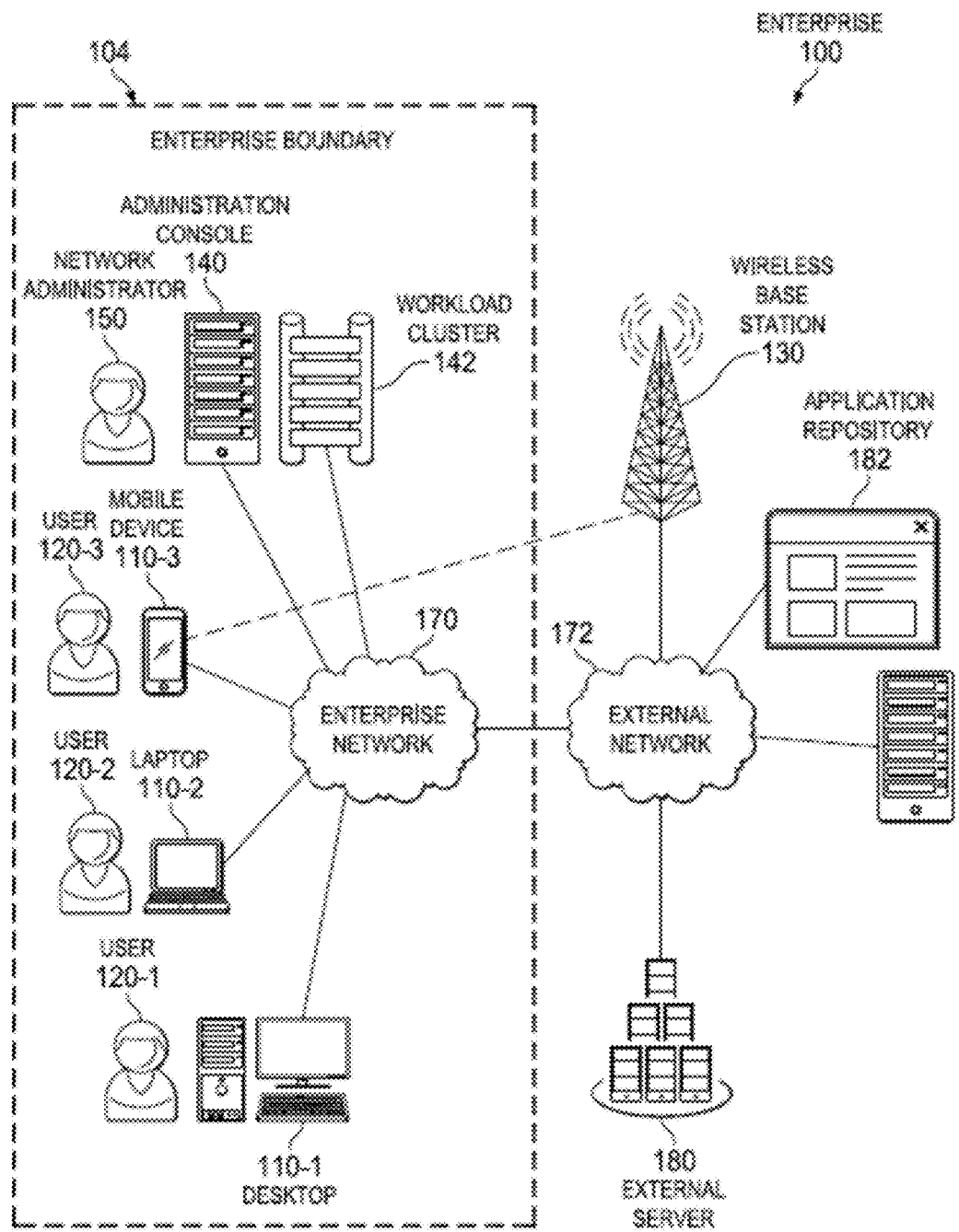
FIG. 1A is a network level diagram of an enterprise computing environment, according to some exemplary embodiments of the present disclosure.

One aspect of the present disclosure provides a method for providing multifunctional switching. The method includes filtering at least some incoming traffic to select network packets originating from one or more predefined sources and destined to a predefined destination, and load balancing at least some of the selected network packets (i.e., the packets that passed the filtering step) among a plurality of server nodes to assign each network packet to one server node of the plurality of server nodes. The method also includes, for each network packet assigned to one server node of the plurality of server nodes, replacing a destination address of the predefined destination with a destination address of the assigned server node, and forwarding the each network packet assigned to one server node in accordance with the replaced destination address in the network packet.

As will be appreciated by one skilled in the art, aspects of the present disclosure, in particular the multifunctional switching functionality described herein, may be embodied as a system, a method or a computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Functions described in this disclosure may be implemented as an algorithm executed by a processor, e.g. a microprocessor, of a computer. Furthermore, aspects of the present disclosure may take the form of a computer program product embodied in one or more computer readable medium(s), preferably non-transitory, having computer readable program code embodied, e.g., stored, thereon. In various embodiments, such a computer program may, for example, be downloaded (updated) to the existing devices and systems (e.g. to the existing network elements such as the existing routers, switches, various control nodes, etc.) or be stored upon manufacturing of these devices and systems.

Example Embodiments

Disclosed are, inter alia, methods, apparatus, data structures, computer-readable medium, mechanisms, and means for multifunctional switching, in particular, but not limited to, those that can be used in redirecting and load balancing network traffic in data centers.

For purposes of illustrating the techniques for multifunctional switching described herein, it is important to understand the activities that may be present in a typical network environment. The following foundational information may be viewed as a basis from which the present disclosure may be properly explained. Such information is offered for purposes of explanation only and, accordingly, should not be construed in any way to limit the broad scope of the present disclosure and its potential applications.

In an example of known computing systems, a cluster (also sometimes referred to as a "server farm") of workload nodes may be provisioned, either as physical servers or as virtual machines, to provide a desired feature to end-users or clients. One non-limiting example of providing such a feature could be the servers providing a website. When a plurality of users make a large number of simultaneous connections to the website, it is necessary to appropriately distribute the workload among the various servers in the server farm.

To this end, incoming traffic from client devices may be routed to a network switch. The network switch may then forward the traffic to a load balancer. An example of a commonly used load balancer is a network appliance or virtual appliance running a Linux operating system and provided with a full network stack, as well as load-balancing logic for determining which server of the server farm to send the traffic to.

For example, a workload cluster may include 16 nodes, where each could be either a physical server or a virtual machine. The load balancer itself may also be either a physical appliance or a virtual appliance. Upon receiving a packet from the network switch, the load balancer determines the load on each of the 16 workload nodes. The load balancer then applies an algorithm to determine an appropriate node for handling the traffic. This may include, for example, identifying the least burdened node and assigning the traffic to that node. Each node may have its own IP address, which is oftentimes not exposed to end-user client devices. Rather, client devices are aware only of the IP address of the load balancer itself. Thus, the load balancer may modify the packet header, for example, by assigning it to the virtual IP (VIP) of one of the workload nodes. The load balancer may then return the packet to the switch, which routes the packet to the appropriate workload node.

In this example, the incoming packet transfers from the switch to the load balancer, which may provide the full OSI 7 layer "stack" in software, operating on a full-featured operating system, such as Linux. Thus, the incoming packet is abstracted up to one of the upper layers of the OSI model, such as layer 6 or 7, so that it can be handled by the load-balancing software. The packet is then de-abstracted to a lower layer and returned to the switch, which forwards it to the appropriate workload node. Upon receiving the packet, the workload node again abstracts the packet up to one of the higher levels of the OSI model.

In addition to load balancing, other functionalities are often performed by external engines, e.g. traffic filtering functionality or network address translating functionality often performed by separate network nodes. In such situations, again, the packets may need to travel back and forth several times and be processed multiple times by different entities (which could necessitate abstracting and de-abstracting the packets) before being provided to a suitable node within a server farm.

The inventors of the present Specification have recognized that various external devices, such as e.g. a load balancer, a device performing traffic filtering, and a device performing network address translation, as well as the overhead necessitated by the use of such devices, represent a potential bottleneck that reduces scalability of a network environment and slows down handling of network traffic. The process of passing the packet up and down the OSI stack, in particular, while very fast from a human point of view, can be a significant bottleneck from the point of view of a network.

The inventors of the present Specification have further recognized that a network element, such as a switch or a router, can be configured to natively carry out traffic filtering, load balancing, and network address translating functionalities in addition to performing its ordinary network switching function. In that case, rather than providing traffic filtering, load balancing, and address translation algorithms in applications running on an operating system, the switch may provide these features via a much faster and scalable solution, such as programmable hardware rather than a general purpose software-driven processor. This means that the traffic filtering, load balancing, and network address translation logic is handled mostly or entirely at the hardware level. Furthermore, the switch generally operates at lower levels of the OSI model, such as layers 1 and 2. Thus, the proposed switch implementation has reduced overhead in abstracting and de-abstracting packets through the OSI stack.

In this manner, the switch itself becomes the traffic filter, load balancer, and network address translator, and rather than acting as a bottleneck, is capable of providing terabit-class bandwidth by operating at the hardware level.

In an example, a concept of traffic buckets and nodes is described. Traffic may be divided into "buckets." Each bucket may be assigned to a node.

A traffic bucket serves as a classifier for identifying a subset of traffic to be redirected. As many traffic buckets can be created as needed for granularity. For bucketization of traffic, various L2/L3 header fields can be used in the algorithm.

By selecting different fields, many buckets can be created. By way of example, we can use B0, B1, B2, B3, B4 . . . . Bn to designate traffic buckets.

A traffic node serves as a "next-hop" for traffic forwarding. A node is an entity that has an associated IP address reachable from the switch. By way of example, we can use N0, N1, N2, N3 Nm to designate nodes.

Mapping can be established to associate a traffic bucket to a node. This association creates a packet path for forwarding of traffic for each bucket. This can include one-to-one mapping of a traffic bucket to a node, or many-to-one mapping of traffic buckets to a node (i.e., multiple nodes may be assigned to a single node).

This architecture realizes substantial advantages over certain existing deployments. For example, some existing load balancers suffer from shortcomings such as inefficiency and expense. In one example, a low capacity load-balancer provides approximately 40 Gbps, while a higher-end load balancer provides approximately 200 Gbps.

As discussed above, speed and scalability are enhanced by programming the load balancing engine in programmable hardware rather than in software running on a general-purpose processor programmed by software. Programmable hardware includes, for example, an application-specific integrated circuit (ASIC), field-programmable gate array (FPGA), programmable logic array (PLA), or similar. Because the logic is implemented directly in hardware, it can execute a "program" orders of magnitude faster than a CPU, which must fetch instructions from memory, and then run those instructions on general-purpose hardware. Furthermore, an operating system, multitasking, and multi-layer network stack introduce additional complexity that does not contribute directly to carrying out the load balancing function. In short, a software-programmable CPU is extremely versatile, and its function may be easily adapted to many different tasks, but it is relatively slow. A dedicated programmable hardware device, programmed only for a single function, is not versatile, but carries out its single, dedicated function very quickly.

In one example, a hardware-based load balancer of the present Specification must be able to handle both traffic that is to be load balanced, and traffic that does not require load balancing. For non-load-balanced traffic, the device should still perform its native function as a switch or router, and simply switch or route the traffic as appropriate.

To aid in this, and to preserve the speed advantage of the programmable hardware-based load balancing engine, it is advantageous not to store data values in standard memories such as random access memories (RAM), as this could negate the speed advantages of the hardware. Rather, in one example, a ternary content-addressable memory (TCAM) is provided, and may be capable of operating at speeds approaching the speed of the programmable hardware itself. A content-addressable memory (CAM) is a species of memory used in extremely high-speed searches, such as those necessary for native terabit-class load balancing. CAM compares the search input (tag) to a table of stored data, and returns the address of matching datum. This is in contrast to RAM, in which the program provides an address, and the RAM returns a value stored at that address. When a search is performed, if the CAM finds a match for the tag, the CAM returns the address of the tag, and optionally, the value of the tag as well. If the tag is not found, a "not found" value is returned. TCAM is a species of CAM, in which a tag can be searched not only for a binary "1" or "0," but also for a ternary "X" (don't care). In other words, the search tag "110X" matches both "1101" and "1100."

In the context of load balancing, a network administrator may configure a virtual IP (VIP) tag, including in one example an IP address, protocol, and port number. Entries may be made in the TCAM for VIP tags that are to be load balanced. Entries may also be made for a set of nodes that can receive traffic matching that VIP tag.

The switch advertises the VIP tag via routing protocols, and receives traffic destined for VIP. When traffic enters the switch or router, the VIP tag is checked against entries in the TCAM. If there is a matching entry, the traffic is to be load balanced. The traffic is then bucketized and load balanced to each node using TCAM entries.

This architecture realizes several important advantages. As servers move from 1 Gbps to 10 Gbps, traditional software load balancers have to scale appropriately. Load balancer appliances and service modules also consume rack-space, power, wiring and cost. However, in an embodiment of the present Specification, every port of a switch or router can act as a load-balancer, no external appliance and no service module are needed, and the teachings of this Specification can be used to provide terabit-class load balancing.

Furthermore, scalability is greatly enhanced. Many network switches have the ability to modularly increase their size by adding on I/O modules. For example, a switch may have a baseline size of 48 ports, wherein each port can be connected to one physical server appliance. The physical server appliance may be a standalone appliance providing the workload service, or may be a server configured to provide a hypervisor and to launch instances of virtual machines on demand. If the 48 ports on the switch are exhausted, an additional I/O module, for example providing an additional 48 ports, may be added onto the switch. Thus, the switch can be scaled up to extremely large sizes with minimal configuration. The switch itself may be provided with a load-balancing engine, which in this case may include dedicated hardware, firmware, or very low-level software such as BIOS to provide the load-balancing logic.

Multifunctional Network Switch

As the foregoing illustrates, network/application traffic needs to be load balanced to set(s) of nodes (e.g. servers and/or appliances). Certain co-pending patent applications describe how a network switch can be configured with load-balancing capabilities, for example using a TCAM to significantly speed up load-balancing operations. As also described above, while this has substantial benefits with respect to load-balancing speed, the switch is handicapped if it is required to serve exclusively as a load balancer and, therefore, it would be desirable to configure a switch to perform additional functions without having to rely on external components to perform those functions. Some embodiments of the present Specification aim to provide means for addressing this issue. In particular, embodiments of the present Specification provide a switch or a router, referred to in the following simply as a "switch," configured to perform not only native load balancing functions but also filtering of traffic and network address translation. A switch may further be configured to redirect some of the traffic. To that end, nodes may be pooled together to form a device group. Tenants may want to provision pool of servers as a device group and deploy load distribution service on a network switch to handle application traffic. The nodes in a single device group may be provisioned to handle traffic for multiple applications, e.g. a single physical server may act as both an email server (by being included in a device group for an email application) and a web server (by being included in a device group for a web application).

A system and method for natively providing multiple functionality on a switch will now be described with more particular reference to the attached FIGURES. Specific examples of components and arrangements are described below to simplify the present disclosure. These are, of course, merely examples and are not intended to be limiting. Further, the present disclosure may repeat reference numerals and/or letters in the various examples. This repetition is for the purpose of simplicity and clarity and does not in itself dictate a relationship between the various embodiments and/or configurations discussed. Different embodiments many have different advantages, and no particular advantage is necessarily required of any embodiment.

In some embodiments, hyphenated reference numerals, such as 10-1 and 10-2, may be used to refer to multiple instances of the same or a similar item 10, or to different species of a genus 10.

FIG. 1A is a network-level diagram of a secured enterprise 100 according to one or more examples of the present Specification. In the example of FIG. 1, a plurality of users 120 operates a plurality of client devices 110. Specifically, user 120-1 operates desktop computer 110-1. User 120-2 operates laptop computer 110-2. And user 120-3 operates mobile device 110-3.

Each computing device may include an appropriate operating system, such as Microsoft Windows, Linux, Android, Mac OSX, Apple iOS, Unix, or similar. Some of the foregoing may be more often used on one type of device than another. For example, desktop computer 110-1, which in one embodiment may be an engineering workstation, may be more likely to use one of Microsoft Windows, Linux, Unix, or Mac OSX. Laptop computer 110-2, which is usually a portable off-the-shelf device with fewer customization options, may be more likely to run Microsoft Windows or Mac OSX. Mobile device 110-3 may be more likely to run Android or iOS. However, these examples are not intended to be limiting.

Client devices 110 may be any suitable computing devices. In various embodiments, a "computing device" may be or comprise, by way of non-limiting example, a computer, workstation, server, mainframe, embedded computer, embedded controller, embedded sensor, personal digital assistant, laptop computer, cellular telephone, IP telephone, smart phone, tablet computer, convertible tablet computer, computing appliance, network appliance, receiver, wearable computer, handheld calculator, virtual machine, virtual appliance, or any other electronic, microelectronic, or microelectromechanical device for processing and communicating data.

Client devices 110 may be communicatively coupled to one another and to other network resources via enterprise network 170. Enterprise network 170 may be any suitable network or combination of one or more networks operating on one or more suitable networking protocols, including for example, a local area network, an intranet, a virtual network, a wide area network, a wireless network, a cellular network, or the Internet (optionally accessed via a proxy, virtual machine, or other similar security mechanism) by way of non-limiting examples. Enterprise network 170 may also include one or more servers, firewalls, routers, switches, security appliances, antivirus servers, or other useful network devices. In this illustration, enterprise network 170 is shown as a single network for simplicity, but in some embodiments, enterprise network 170 may include a large number of networks, such as one or more enterprise intranets connected to the Internet. Enterprise network 170 may also provide access to an external network, such as the Internet, via external network 172. External network 172 may similarly be any suitable type of network.

A network administrator 150 may operate an administration console 140 to administer a workload cluster 142 and to otherwise configure and enforce enterprise computing and security policies.

Enterprise 100 may encounter a variety of "network objects" on the network. A network object may be any object that operates on or interacts with enterprise network 170. In one example, objects may be broadly divided into hardware objects, including any physical device that communicates with or operates via the network, and software objects. Software objects may be further subdivided as "executable objects" and "static objects." Executable objects include any object that can actively execute code or operate autonomously, such as applications, drivers, programs, executables, libraries, processes, runtimes, scripts, macros, binaries, interpreters, interpreted language files, configuration files with inline code, embedded code, and firmware instructions by way of non-limiting example. A static object may be broadly designated as any object that is not an executable object or that cannot execute, such as documents, pictures, music files, text files, configuration files without inline code, videos, and drawings by way of non-limiting example. In some cases, hybrid software objects may also be provided, for example, a word processing document with built-in macros or an animation with inline code. For security purposes, these may be considered as a separate class of software object, or may simply be treated as executable objects.

Enterprise security policies may include authentication policies, network usage policies, network resource quotas, antivirus policies, and restrictions on executable objects on client devices 110 by way of non-limiting example. Various network servers may provide substantive services such as routing, networking, enterprise data services, and enterprise applications.

Secure enterprise 100 may communicate across enterprise boundary 104 with external network 172. Enterprise boundary 104 may represent a physical, logical, or other boundary. External network 172 may include, for example, websites, servers, network protocols, and other network-based services. In one example, a wireless base station 130, an external server 180, and an application repository 182 may be provided on external network 172, by way of nonlimiting example. Wireless base station 130 may be, for example, an LTE base station or other similar device that connects to mobile device 110-3 wirelessly. Wireless base station 130 may in turn communicatively couple to external network 172. External server 180 may be a server that provides web pages, data, or other resources that enterprise users 120 may need to use.

Application repository 182 may represent a Windows or Apple "App Store" or update service, a Unix-like repository or ports collection, or other network service providing users 120 the ability to interactively or automatically download and install applications on client devices 110. In some cases, secured enterprise 100 may provide policy directives that restrict the types of applications that can be installed from application repository 182. Thus, application repository 182 may include software that is not malicious, but that is nevertheless against policy. For example, some enterprises restrict installation of entertainment software like media players and games. Thus, even a secure media player or game may be unsuitable for an enterprise computer. Security administrator 150 may be responsible for distributing a computing policy consistent with such restrictions and enforcing it on client devices 120.

In another example, secured enterprise 100 may simply be a family, with parents assuming the role of security administrator 150. The parents may wish to protect their children from undesirable content, such as pornography, adware, spyware, age-inappropriate content, advocacy for certain political, religious, or social movements, or forums for discussing illegal or dangerous activities, by way of non-limiting example. In this case, the parent may perform some or all of the duties of security administrator 150.

Figure 1B:
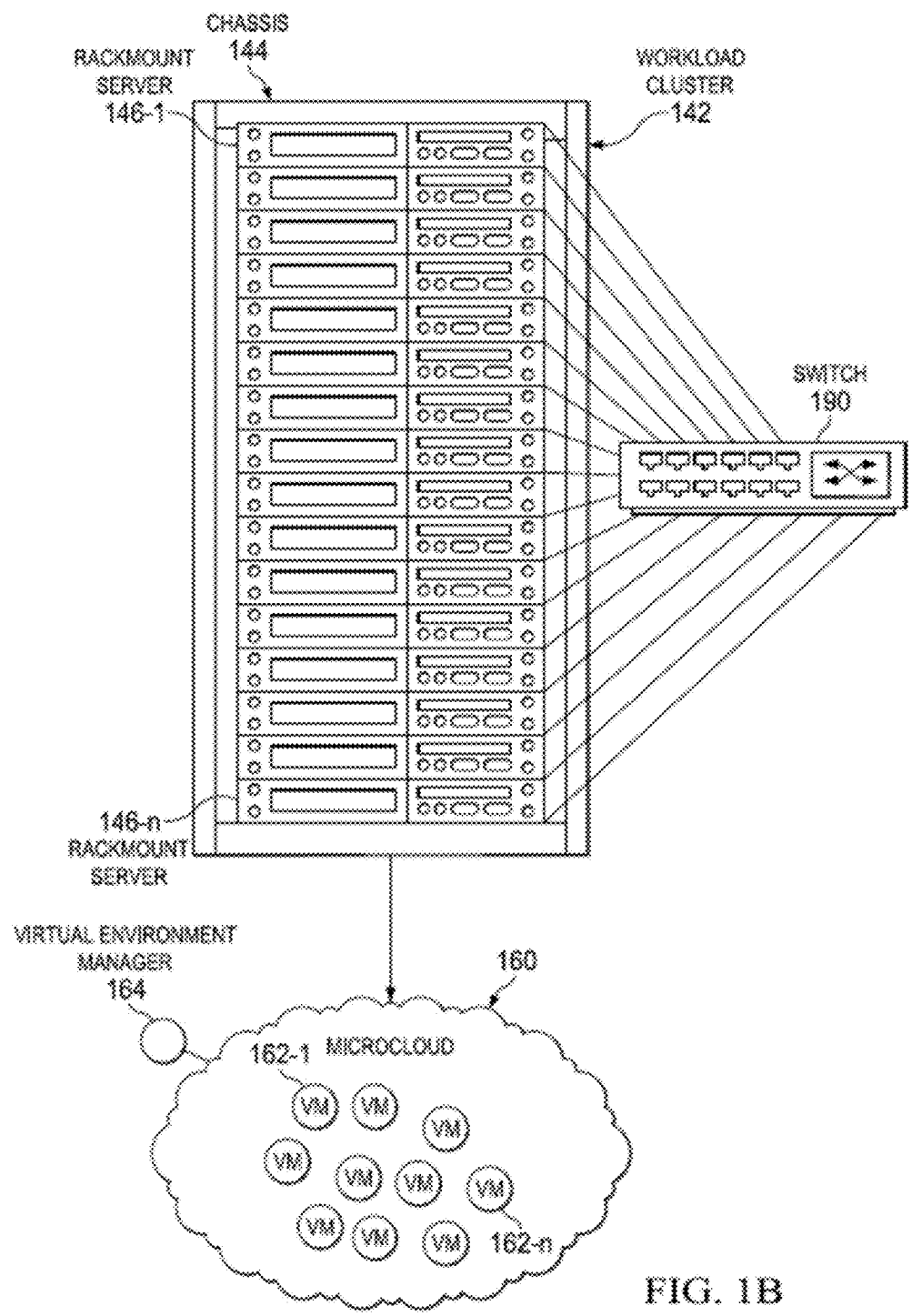
FIG. 1B is a more detailed view of a computing cluster, according to some exemplary embodiments of the present disclosure.

FIG. 1B is a block diagram disclosing a workload cluster 142 according to one or more examples of the present Specification. In this example, workload cluster 142 includes a rack mount chassis 144 which has installed therein a plurality of rack mount servers 146-1 through 146-N. Each rack mount server 146 may be a dedicated appliance, or may be configured with a hypervisor to launch one or more instances of a virtual client.

A switch 190 may be provided to communicatively couple workload cluster 142 to enterprise network 170. As described below, switch 190 may have a number of physical ports for communicatively coupling to rack mount servers 146. In an example, each server 146 has a physical wired connection, such as an Ethernet connection, to a single port of switch 190.

In some cases, some or all of rack mount servers 146-1 through 146-N are dedicated to providing a microcloud 160. Microcloud 160 may be a single purpose or dedicated cloud providing a particular service. For example, microcloud 160 may be configured to serve a website, provide communication systems such as one or more 4G LTE services, or any other appropriate service. In some cases, microcloud 160 is provided as a "tenant" on workload cluster 142. Workload cluster 142 may provide a virtual environment manager 164, which may be responsible for enforcing tenant boundaries between one or more microcloud tenants 160, and for dynamically provisioning virtual machines 162 as necessary. Virtual machines 162-1 through 162-N may represent a plurality of instances of a virtual server appliance. In some cases, VMs 162 may also be provided in different flavors. For example, some VMs 162 may be provisioned as firewalls, others may be provisioned as antivirus scanning appliance, and yet others may provide other auxiliary functions, in addition to VMs 162 provisioned as workload nodes.

When switch 190 is provisioned with a load-balancing engine, the load-balancing engine is responsible for keeping track of the number and virtual IP (VIP) of workload nodes, so that it can properly route traffic to the workload nodes. In the case where each rack mount server 146 is a standalone appliance, switch 190 may maintain a table of the VIP of each rack mount server 146. In cases where workload nodes are provided in a microcloud 160, switch 190 may provide a table that maps the VIP of each VM to a VIP assigned to the physical rack mount server 146 on which that VM 162 resides. Thus, switch 190 may include logic not only for routing the packet to the correct rack mount server 146, but also for directing the packet to the correct VM 162 on that rack mount server 146.

Figure 2A:
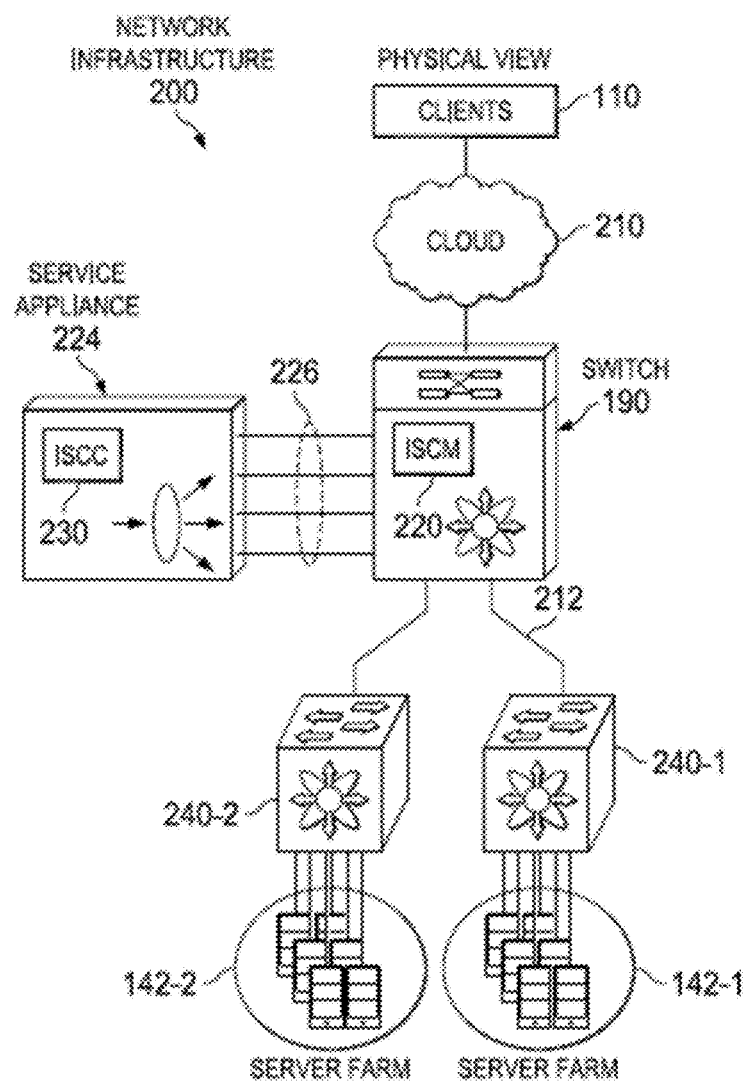
FIG. 2A is a is a simplified schematic diagram illustrating a physical view of a system for providing service appliances in a network environment, according to some exemplary embodiments of the present disclosure.
Figure 2B:
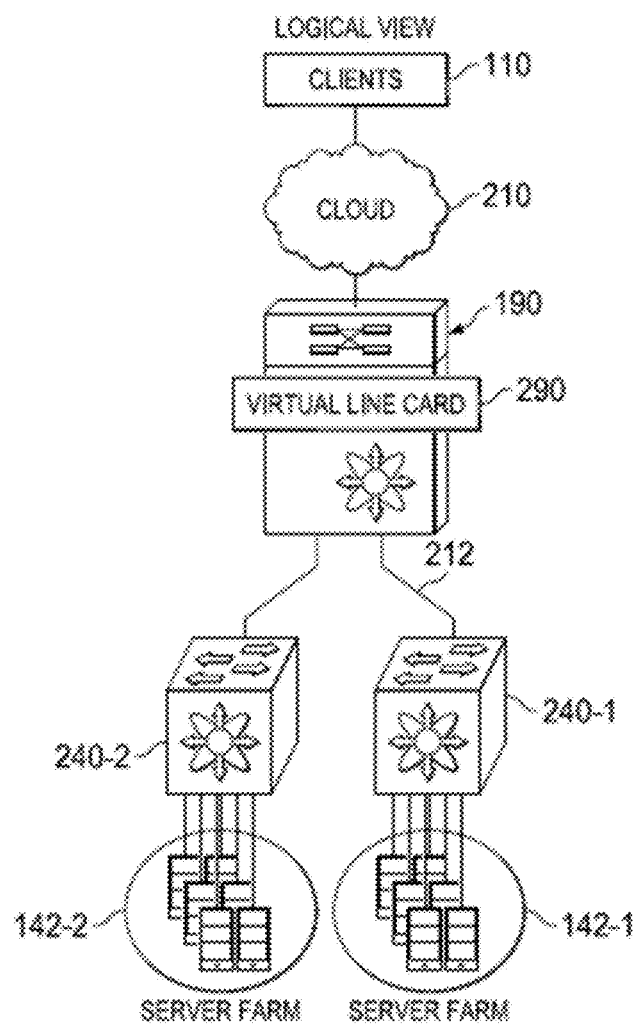
FIG. 2B is a simplified schematic diagram illustrating a logical view of the system, according to some exemplary embodiments of the present disclosure.

FIGS. 2A and 2B show examples of a system architecture for providing service appliances in a network environment, and specifically, providing service appliances as virtual line cards in a network switch. The virtual line card allows the service appliances to be located anywhere in the network, but other ways of providing the service appliance (e.g., directly connecting the service appliance on the switch) are also possible. It is noted that the examples are merely illustrative and are not intended to be limiting. Other architectures and configurations are envisioned by the disclosure.

FIG. 2A is a simplified schematic diagram illustrating a physical view of a network infrastructure 200 for providing service appliances in a network environment. FIG. 2A includes a network (illustrated as multiple links 212) that connects one or more server farms 142-1 and 142-2 to one or more clients 110 via a cloud 210. Cloud 210 may encompass any public, semi-public, and/or private networks including enterprise networks, an Internet or intranet, community networks, etc. Individual servers in server farm 142-1 and 142-2 may communicate within the same farm via switches 240-1 and 240-2, respectively. Servers in server farm 142-1 may communicate with servers in server farm 142-2 via a switch 190 in this particular example implementation.

A service appliance 224 may connect to switch 190 over a communication channel 226 (e.g., over a port-channel). As used herein, a "communication channel" encompasses a physical transmission medium (e.g., a wire), or a logical connection (e.g., a radio channel, a network connection) used to convey information signals (e.g., data packets, control packets, etc.) from one or more senders (e.g., switch 190) to one or more receivers (e.g., service appliance 224). A communication channel, as used herein, can include one or more communication links, which may be physical (e.g., wire) or logical (e.g., data link, wireless link, etc.). Termination points of communication channels can include interfaces such as Ethernet ports, serial ports, etc. In embodiments of network infrastructure 200, communication channel 226 may be a single channel: deployed for both control messages (i.e., messages that include control packets) and data messages (i.e., messages that include data packets).

As used herein, a "service appliance" is a discrete (and generally separate) hardware device or virtual machine with integrated software (e.g., firmware), designed to provide one or more network services including load balancing, firewall, intrusion prevention, virtual private network (VPN), proxy, etc. In some cases, switch 190 may be configured with an intelligent service card manager module (ISCM) 220, and service appliance 224 may be configured with a corresponding intelligent service card client module (ISCC) 230. ISCM 220 and ISCC 230 can form part of a Remote Integrated Service Engine (RISE) infrastructure for configuring service appliance 224 on the switch, e.g., as a virtual line card in switch 190.

FIG. 2B is a simplified schematic diagram illustrating a logical view of network infrastructure 200. In some cases, ISCC 230 and ISCM 220 may be configured to allow service appliance 224 to appear as a virtual line card 290, or some other virtual network node/entity. The terms "line card" and "service module" are interchangeably used herein to refer to modular electronic circuits interfacing with telecommunication lines (such as copper wires or optical fibers) and that offer a pathway to the rest of a telecommunications network. Service appliance is often referred simply as "appliance" or "module" herein. Hence, virtual line card 290 is interchangeable (in certain instances) with ISCM 220. A virtual service module (or a virtual line card) is a logical instance (of a service module) providing the same functionalities (as the service module). Service modules may perform various functions including providing network services (e.g., similar to service appliances). One difference between a service module and a service appliance is that the service module is physically located within a switch, for example, on an appropriate slot. Virtual service modules are similarly configurable within a switch.

In an example, RISE (or comparable technologies) allows (external) service appliances connect to a switch and behave like a service module within a switch without having to take up a physical slot in the switch. RISE helps consolidate how the appliances are provisioned, and enables the appliances to have the benefits of being a service module within the switch. The task for provisioning and configuring of these service appliances is performed mostly by RISE being provided on the switch, making it easy for network administrators to add/remove service appliances in the network.

According to embodiments of the present disclosure, an appliance user can enjoy the same benefit of a service module's simple configuration and operation using the infrastructure of network infrastructure 200. For example, setting up service appliance 224 for network configurations may be unnecessary. Substantially all such configurations may be made via switch 190, instead of service appliance 224. Service appliance 224 may offload (i.e., transfer) any network (e.g., L2/L3 network) specific control plane and data plane operations to switch 190. Data path acceleration that leverages an application specific integrated circuit (ASIC) (potentially embedded in switch 190) may also be possible in various embodiments. Switch 190 may communicate control messages to service appliance 224 over communication channel 226. Thus, configuration and provisioning of services within service appliance 224 may be implemented via switch 190.

Note that the numerical and letter designations assigned to the elements of FIGS. 2A and 2B do not connote any type of hierarchy; the designations are arbitrary and have been used for purposes of teaching only. Such designations should not be construed in any way to limit their capabilities, functionalities, or applications in the potential environments that may benefit from the features of network infrastructure 200. For ease of description, only two representative server farms are illustrated in FIGS. 2A and 2B. Any number of server farms and switches may be connected in the network without departing from the broad scope of the present disclosure.

For purposes of illustrating the techniques of network infrastructure 200, it is important to understand the communications in a given system such as the system shown in FIGS. 2A and 2B. The following foundational information may be viewed as a basis from which the present disclosure may be properly explained. Such information is offered earnestly for purposes of explanation only and, accordingly, should not be construed in any way to limit the broad scope of the present disclosure and its potential applications.

Typically, network services such as load balancing, firewall, intrusion prevention, proxy, virtual private network (VPN), etc. are provided through one or more of the following options: (1) service appliances that connect to network switches and routers; (2) specially designed high-performance routers configured with the services; or (3) network devices such as routers or switches that are configured with service modules that provide the services.

Some service appliances (e.g., load balancers) integrate services such as load balancing, firewall, intrusion prevention, VPN, etc. in a single box format, which is generally based on modular, scalable platforms and which provides a cost-effective option of the three options listed previously. Service appliances may be connected externally to a switch (e.g., aggregate switch or access switch, etc.) via appropriate ports. Different service appliances are designed with specific features applicable to different network environments. The service appliances may be deployed independently to service-specific areas of the network infrastructure, or they may be combined for a layered approach. Service appliances are typically located between the clients and server farms. Data packets generally pass through the service appliances on the way to (and from) the servers/clients. The service appliances may be managed by a management application (e.g., software) on the service appliance that enables configuration settings and other management functions.

Specially designed high-performance routers may also provide network services. Such routers may implement a massive parallel processor hardware and software architecture to deliver integrated network services (e.g., firewall, deep packet inspection, etc.). Many of the functionalities are embedded in a specially designed processor in the router. For example, such a specially designed router can provide an integrated security solution (e.g., stateful packet filtering, intrusion detection and prevention, per-user authentication and authorization, VPN capability, extensive QoS mechanisms, multiprotocol routing, voice application support, and integrated WAN interface support) and routing in a single box.

Network services may also be integrated into a network device (such as a switch or router) using dedicated line cards. The line cards may be installed inside the device, allowing any port on the device to operate as a firewall port, while integrating the services inside the network infrastructure. Several line cards may be installed in the same chassis, providing a modular solution where needed. Such solutions permit the user to take advantage of existing switching and routing infrastructure without any costly upgrades.

Turning to the potential infrastructure of FIGS. 2A and 2B, the example network environment may be configured as one or more networks and, further, may be configured in any form including, but not limited to, local area networks (LANs), wireless local area networks (WLANs), virtual local area networks (VLANs), metropolitan area networks (MANs), wide area networks (WANs), VPNs, Intranet, Extranet, any other appropriate architecture or system, or any combination thereof that facilitates communications in a network. In some embodiments, a communication link may represent any electronic link supporting a LAN environment such as, for example, cable, Ethernet, wireless technologies (e.g., IEEE 802.11x), ATM, fiber optics, etc. or any suitable combination thereof. In other embodiments, communication links may represent a remote connection through any appropriate medium (e.g., digital subscriber lines (DSL), telephone lines, T1 lines, T3 lines, wireless, satellite, fiber optics, cable, Ethernet, etc. or any combination thereof) and/or through any additional networks such as a wide area networks (e.g., the Internet).

Elements of FIGS. 2A and 2B may be coupled to one another through one or more interfaces employing any suitable connection (wired or wireless), which provides a viable pathway for electronic communications. Additionally, any one or more of these elements may be combined or removed from the architecture based on particular configuration needs. Network infrastructure 200 may include a configuration capable of transmission control protocol/Internet protocol (TCP/IP) communications for the electronic transmission or reception of packets in a network. Network infrastructure 200 may also operate in conjunction with a user datagram protocol/IP (UDP/IP) or any other suitable protocol, where appropriate and based on particular needs. In addition, gateways, routers, switches, and any other suitable network elements may be used to facilitate electronic communication between various nodes in the network.

Switches in network infrastructure 200, including switches 190, 240-1, and 240-2, may include any type of network element connecting network segments. For example, switches 190, 240-1, and 240-2 may include a multi-port network bridge that processes and routes data at a data link layer (Layer 2). In another example, switches 190, 240-1, and 240-2 may process data at a network layer (Layer 3), or Layer 4 (with network address translation and load distribution), or Layer 7 (load distribution based on application specific transactions), or at multiple layers (e.g., Layer 2 and Layer 3). In certain embodiments, functionalities of switches 190, 240-1, and 240-2 may be integrated into other network devices such as gateways, routers, or servers. In various embodiments, switches 190, 240-1, and 240-2 may be managed switches (e.g., managed using a command line interface (CLI), a web interface, etc.).

Communication channel 226 may include a port-channel, which can encompass an aggregation of multiple physical interfaces into one logical interface, for example, to provide higher aggregated bandwidth, load balancing and link redundancy. Communication channel 226 with multiple links can provide a high availability channel: if one link fails, traffic previously carried on this link can be switched to the remaining links. Communication channel 226 may contain up to 16 physical communication links and may span multiple modules for added high availability. In one embodiment, communication channel 226 can represent a port-channel with an aggregation of four point-to-point communication links over multiple ports. In another embodiment, communication channel 226 can represent a virtual port-channel (vPC).

Although FIGS. 2A and 2B show server farms 142-1 and 142-2, it should be appreciated that network infrastructure 200 is not limited to servers. In fact, any network element may be connected to the network via appropriate switches, where these implementations may be based on particular needs. As used herein, the term "network element" is meant to encompass computers, virtual machines, network appliances, servers, routers, switches, gateways, bridges, load balancers, firewalls, processors, modules, or any other suitable device, component, proprietary element, or object operable to exchange information in a network environment. Moreover, the network elements may include any suitable hardware, software, components, modules, interfaces, or objects that facilitate the operations thereof. This may be inclusive of appropriate algorithms and communication protocols that allow for the effective exchange of data or information. For example, server farms 142-1 and 142-2 may be replaced with LANs connecting desktop computers in a small office. In another example, server farms 142-1 and 142-2 may be replaced with a network of wireless communication devices. In yet another example, server farms 142-1 and 142-2 may be replaced with one or more supercomputers. Various other configurations and devices are contemplated within the broad framework of the present disclosure.

According to embodiments of the present disclosure, network infrastructure 200 may provide for a fabric extender (FEX)-like protocol, auto-discovery, message transport service (MTS)-like control messages, and defined messages between service appliance 224 and switch 190. Configuration of service appliance 224 may be performed on switch 190 as for a line card. Data path forwarding may be offloaded to network line cards in switch 190. Control path processing may be offloaded to a supervisor engine on switch 190 as appropriate. In embodiments where service appliance 224 has multiple virtual services (e.g., virtual machines), each virtual service may be a separate virtual line card on switch 190.

Figure 3:
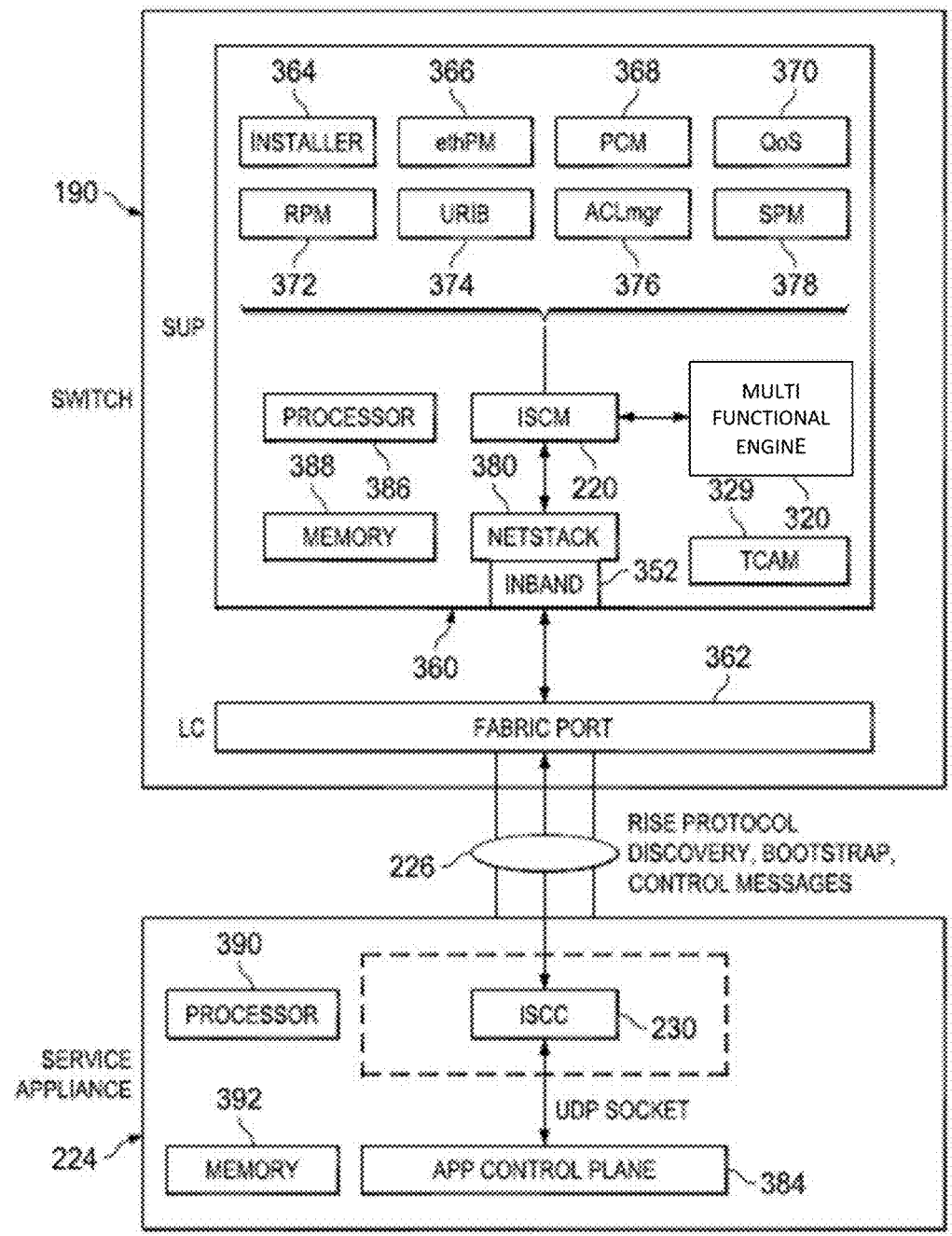
FIG. 3 is a block diagram of a hardware element, according to some exemplary embodiments of the present disclosure.

FIG. 3 is a simplified block diagram illustrating example details of network infrastructure 200 according to embodiments of the present disclosure. A supervisor engine 360 on switch 190 may communicate with service appliance 224 via a line card including a fabric port 362 that connects point-to-point to a node on service appliance 224. Supervisor engine 360 may include several modules such as an installer 364, an Ethernet port manager (ethPM) 366, a port-channel manager (PCM) 368, a Quality of Service (QoS) element 370, a route policy manager (RPM) 372, a unified/unicast routing information base (URIB) 374, an access control list manager (ACLmgr) 376, and a service policy manager (SPM) 378 for performing various routing and/or management functions. ISCM 220 may be provisioned in supervisor engine 360 to provide RISE related functionalities. ISCM 220 may manage one or more service modules, including in-chassis service modules and remote service modules.

In various embodiments, service appliance 224 may support stream control transmission protocol (SCTP) with various addresses (e.g., 127 addresses). In the absence of native SCTP support in supervisor engine 360, tunneling over UDP may be enforced to send SCTP packets. A Netstack module 380 may be provisioned in supervisor engine 360 for implementing TCP/IP stack for received frames hitting the control-plane of supervisor engine 360. Supervisor engine 360 may be configured with an inband port 352, which may be a virtual port that provides an interface for management traffic (such as auto-discovery) to a management processor such as a processor 386.

Each logical block disclosed herein is broadly intended to include one or more logic elements configured and operable for providing the disclosed logical operation of that block. As used throughout this Specification, "logic elements" may include hardware, external hardware (digital, analog, or mixed-signal), software, reciprocating software, services, drivers, interfaces, components, modules, algorithms, sensors, components, firmware, microcode, programmable logic, or objects that can coordinate to achieve a logical operation.

In various examples, a "processor" may include any combination of logic elements, including by way of non-limiting example a microprocessor, digital signal processor, field-programmable gate array, graphics processing unit, programmable logic array, application-specific integrated circuit, or virtual machine processor. In certain architectures, a multi-core processor may be provided, in which case processor 386 may be treated as only one core of a multi-core processor, or may be treated as the entire multi-core processor, as appropriate. In some embodiments, one or more co-processor may also be provided for specialized or support functions. In some examples, the processor is a programmable hardware device, which in this Specification expressly excludes a general-purpose CPU.

Multifunctional engine 320, in one example, is operable to carry out computer-implemented methods as described in this Specification. Multifunctional engine 320 may include one or more processors, and one or more non-transitory computer-readable mediums having stored thereon executable instructions operable to instruct a processor to provide load balancing. As used throughout this Specification, an "engine" includes any combination of one or more logic elements, of similar or dissimilar species, operable for and configured to perform one or more methods provided by multifunctional engine 320. Thus, multifunctional engine 320 may comprise one or more logic elements configured to provide methods as disclosed in this Specification. In some cases, multifunctional engine 320 may include a special integrated circuit designed to carry out a method or a part thereof, and may also include software instructions operable to instruct a processor to perform the method. In some cases, multifunctional engine 320 may run as a "daemon" process. A "daemon" may include any program or series of executable instructions, whether implemented in hardware, software, firmware, or any combination thereof, which runs as a background process, a terminate-and-stay-resident program, a service, system extension, control panel, bootup procedure, BIOS subroutine, or any similar program that operates without direct user interaction. In certain embodiments, daemon processes may run with elevated privileges in a "driver space," or in ring 0, 1, or 2 in a protection ring architecture. It should also be noted that multifunctional engine 320 may also include other hardware and software, including configuration files, registry entries, and interactive or user-mode software by way of non-limiting example.

In one example, multifunctional engine 320 includes executable instructions stored on a non-transitory medium operable to perform a method according to this Specification. At an appropriate time, such as upon booting the device or upon a command from the operating system or a user, multifunctional engine 320 may retrieve a copy of software from storage and load it into memory. The processor may then iteratively execute the instructions of multifunctional engine 320 to provide the desired method.

In another example, multifunctional engine 320 includes logic executed on an ASIC, FPGA, or other low-level hardware device specifically programmed to carry out the functions of multifunctional engine 320. In one case, any portions of multifunctional engine 320 that are not hard-coded into the logic may be loaded from a firmware or similar memory. In this case, multifunctional engine 320 may operate without the benefit of an operating system, to improve speed and efficiency.

Multifunctional engine 320 may also communicatively couple to a TCAM 329. TCAM 329 may be configured to provide high-speed searching as disclosed herein.

According to various embodiments, ISCM 220 may offer various functionalities such as handling (i.e., accommodating, managing, processing, etc.) RISE messages (e.g., in MTS format), high availability activities, timer events, packet switch stream (PSS), American Standard Code for Information Interchange (ASCII) generation, logging, event handling, health monitoring, debugging, etc. ISCM 220 may be a finite state machine utility (FSMU) based application (e.g., which indicates an abstract machine that can be in one of a finite number of states). In various embodiments, ISCM 220 may have a well-defined MTS seamless authentication protocol (MTS SAP) assigned and it can open a socket-based MTS queue and bind to the well-defined SAP such that other processes may communicate with it.

In various embodiments, ISCM 220 may also maintain an array of MTS operation code ("opcode"), which can define how to process a received MTS message. The array may include per-opcode specific MTS flags, handler functions, etc. ISCM 220 may be configured to receive CLI driven MTS messages, MTS notifications (such as event driven messages indicating, for example, that a particular VLAN is up or down), and MTS request/responses. In various embodiments, ISCM 220 may be configured so that MTS-based communication with other processes may be non-blocking and asynchronous. Thus, ISCM 220 may handle multiple events (which can arrive at any time) for the same resource such that the state of the resource is consistent (and not compromised). A similar opcode can be provided even in non-MTS messages, which serves to indicate how to a switch or a service can process the message.

After ports (e.g., appliance ports and switch ports) have been configured in RISE mode, ISCM 220 and ISCC 230 may perform auto-discovery and bootstrap to establish an appropriate control channel. After the control channel is established, applications in service appliance 224 may send control messages (e.g., using the UDP socket interface) to ISCC 230 through an application control plane 384. Application control plane 384 generally encompasses one or more software components for performing workflow management, self-management, and other application control layer processes. ISCC 230 may forward the control messages to ISCM 220 of switch 190 over communication channel 226. In example embodiments, ISCM 220 and ISCC 230 may communicate via UDP packets; however, various other protocols and formats may be accommodated by the teachings of the present disclosure. Supervisor 360 may be provisioned with (or have access to) processor 386 and a memory 388 for performing its various functions. ISCM 220 may use processor 386 and memory 388 to perform RISE related functions in switch 190. Similarly, service appliance 224 may be provisioned with (or have access to) a processor 390 and a memory 392. ISCC 230 may use processor 390 and memory 392 to perform RISE related functions in service appliance 224.

FIG. 4 is a block diagram of a routing table 400 according to one or more examples of the present Specification. In this example, four nodes are provided, designated node N0, N1, N2, and N3. Each node may represent a server appliance having a unique VIP, whether a dedicated hardware server appliance or a virtual server appliance.

Multifunctional engine 320 designates 8 traffic buckets, labeled B0, B1, B2, B3, B4, B5, B6, and B7. Based on load and demand, multifunctional engine 320 maps each traffic bucket to an appropriate node. In this example, buckets B0 and B4 are mapped to node N0. Buckets B1 and B5 are mapped to node N1. Buckets B2 and B6 are mapped to node N2. Buckets B3 and B7 are mapped to node N3. These mappings are provided by way of a non-limiting example only, and are provided strictly to illustrate the principle of mapping buckets to nodes.

When switch 190 receives incoming traffic, multifunctional engine 320 operates to execute an appropriate algorithm for assigning the incoming traffic to a traffic bucket as well as perform further functionality such as e.g. traffic filtering and network address translation. Assigning traffic to a traffic bucket may include, for example, random or pseudorandom assignment, round robin scheduling, or any suitable scheduling algorithm. In one example, an algorithm may be based on the source IP address of the incoming packet, as described in more detail in connection with FIGS. 7 and 9.

After assigning the traffic to a bucket, switch 190 may modifies the packet with appropriate L3 or/and L2 addresses, e.g. with the appropriate VIP for the node servicing that bucket, and forwards the packet.

When a response comes, switch 190 modifies the packet to reflect the publically visible IP address of switch 190, so that the load balancing and other multi-functionality of the switch 190 is completely invisible to external nodes.

FIG. 5 is a flowchart of an example method 500 performed by multifunctional engine 320 according to one or more examples of the present Specification.

In block 510, switch 190 receives incoming traffic and provides the incoming traffic to multifunctional engine 320.

In block 520, switch 190 compares the destination IP of the incoming traffic to the VIP designated for load balancing. If there is a match, the incoming traffic is provided to multifunctional engine 320 for load balancing. If not, then switch 190 simply routes or switches the traffic according to its normal function.

In block 530, multifunctional engine 320 assesses workload balance for available workload nodes. As described above, this may be performed via round-robin assignment, random or pseudo-random assignment, or any other suitable load balancing algorithm.

In block 540, multifunctional engine 320 identifies the best available node for servicing the incoming traffic, based on the assessing of block 530.

In block 550, according to the identifying of block 540, multifunctional engine 320 assigns the incoming traffic to a bucket for associated with the best available node. Assigning to a node may comprise modifying the header to reflect the VIP for the assigned node.

In block 570, after multifunctional engine 320 has assigned the traffic to an appropriate bucket and thereby to an appropriate node, switch 190 forwards the incoming traffic to the node designated for servicing that bucket, specifically by forwarding the traffic to the appropriate VIP.

In block 580, multifunctional engine 320 may log the transaction, as appropriate or necessary.

In block 590, the method is done.

FIG. 6 illustrates a method of performing load balancing on a switch with the aid of a TCAM, such as TCAM 329 according to one or more examples of the present Specification. This example employs the notion of a flow. In an example, a flow is uniquely identified by a tuple T, comprising src-ip (source IP address), dst-ip (destination IP address), protocol, L4-src-port (layer 4 source port) and L4-dst-port (layer 4 destination port).

In an example, a client device 110-1 sends a packet directed to a VIP serviced by switch 190. By way of illustration, this flow is referred to as F1, and tuple T1 identifies flow F1. Tuple T1 comprises (Dev-110-1-IP, VIP, TCP, L4-src-port, L4-dest-port).

Similarly client device 110-2 initiates traffic to the same VIP. Since client 110-2's IP address is different from client 110-1's, this flow will have a different Tuple. By way of illustration, this is referred to as flow F2, identified by tuple T2. Tuple T2 comprises (Dev-110-2-IP, VIP, TCP, L4-src-port, L4-dest-port).

In various examples, sets of buckets may be part of a "pool," and one or more pools can be assigned to a single VIP, allowing VIP traffic to be load balanced among server nodes.

Referring now to method 600 in FIG. 6, it is assumed that switch 190 has now received flows F1 and F2.

In block 610, TCAM 329 looks up the IP address of VIP as it appears in both flows. In this example, both flows are directed to VIP, which is a virtual IP address for a service provided by servers in workload cluster 142. Thus, switch 190 can quickly determine that flows F1 and F2 are to be load balanced.

In block 620, multifunctional engine 320 assigns each node to a traffic bucket as described herein. In certain examples, this may be accomplished by any of the load balancing algorithms disclosed herein, or by any other appropriate load balancing algorithm. In one example, assigning each flow to a bucket comprises assigning according to method 900 of FIG. 9. In that case, TCAM 329 may include a table mapping masked IP address fragments to traffic buckets.

In block 640, multifunctional engine 320 assigns each flow to a node for servicing, such as a workload node in workload cluster 142. This may be a deterministic assignment based on the traffic bucket that each flow was assigned to. For increased speed, this may also be performed using TCAM 329. For example, TCAM 329 may include a table mapping traffic buckets to service nodes.

In block 660, multifunctional engine 320 rewrites the L2 header for the incoming packets. For example, assuming that flow F1 was assigned to service node 1 in workload cluster 142, and flow F2 was assigned to service node 2 in workload cluster 142, multifunctional engine 320 rewrites the L2 headers for the packets in those flows to direct them to their respective service nodes. In addition, multifunctional switch 320 may rewrite the destination IP address of the L3 header for the incoming packets by replacing the VIP address with IP address of respective service nodes 1, 2, 3 and 4.

In block 680, switch 190 is finished with its load balancing tasks, and now acts as a switch, switching or routing the packets to the nodes provided by their new L2/L3 headers.

Blocks 610 through 680 are repeated for each incoming packet, with an appropriate bucket and service node being selected for each. Assuming a well-configured multifunctional engine 320, packets will be well distributed across available service nodes in workload cluster 142 so that workload is optimally distributed across available service nodes.

Reverse traffic (response from service nodes to client devices) are delivered directly to the respective clients without any intervention from multifunctional engine 320.

Figure 7:
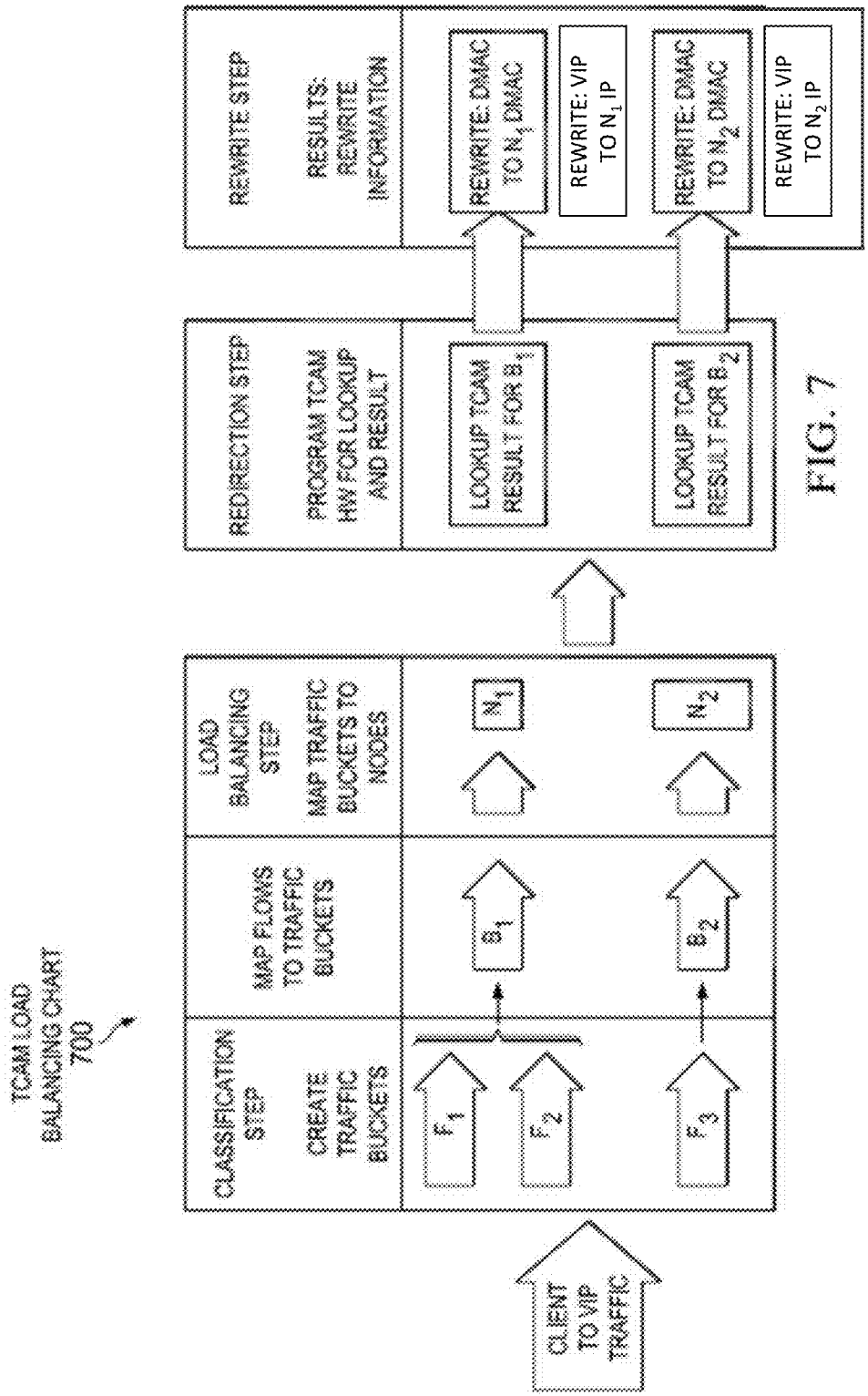
FIG. 7 is a block diagram of a TCAM load balancing chart.

FIG. 7 is a block diagram view 700 of method 600 as described in FIG. 6.

Figure 8:
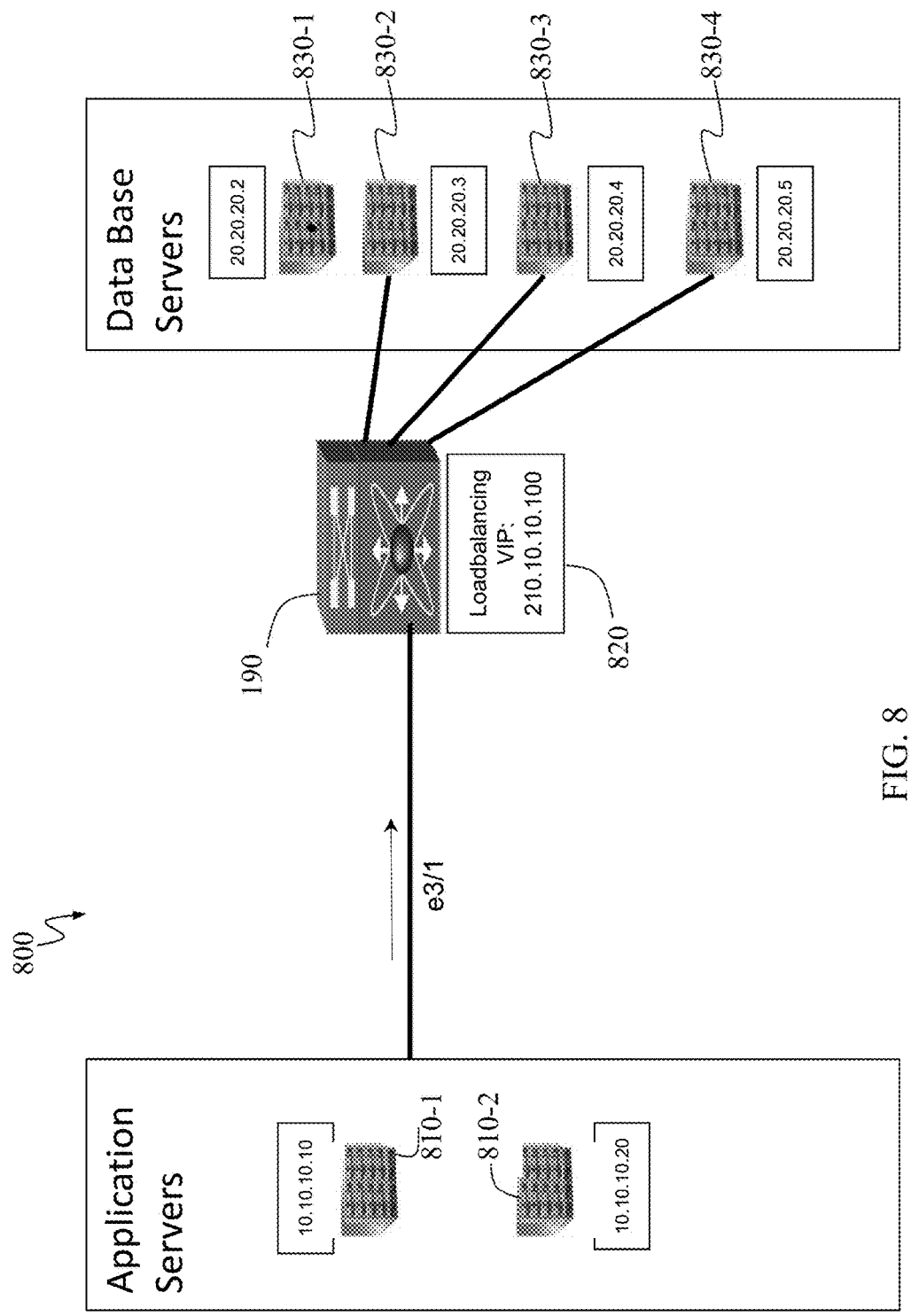
FIG. 8 is a schematic illustration of a network environment comprising a multifunctional network switch, according to some exemplary embodiments of the present disclosure.

FIG. 8 is a schematic illustration of a network environment 800 comprising a multifunctional switch 190 with a load balancing VIP 820 shown by way of example with an IP address 210.10.10.100. Switch 190 shown in FIG. 8 is configured to providing native multifunctional switching for traffic from one or more client nodes 110, shown in the exemplary illustration of FIG. 8 as application servers 810-1 and 810-2, to one or more server nodes, shown in the exemplary illustration of FIG. 8 as data base servers 830-1, 830-2, 830-3, and 830-4, according to one or more examples of the present Specification.

The load balancing VIP could comprise a multifunctional engine, such as e.g. the multifunctional engine 320, as described herein. The one or more application servers 810 could comprise one or more service appliances as described herein, e.g. providing a web page or email services. While FIG. 8 illustrates a single E3 communication channel between the application servers 810 and the switch 190, shown as interface "e3/1," in other embodiments, different application servers 810 could communicate with the switch 190 via different communication channels, e.g. via different E3 communication channels/interfaces. The one or more nodes 830 could comprise workload nodes of one or more server farms described herein.

As shown in FIG. 8 by way of example, nodes 810-1 and 810-2 could be associated with IP addresses designated as e.g. 10.10.10.10 and 10.10.10.20, respectively, while nodes 830-1, 830-2, 830-3, and 830-4 could be associated with IP addresses designated, respectively, as e.g. 20.20.20.2, 20.20.20.3, 20.20.20.4, and 20.20.20.5. The load balancing VIP 810 could be associated with an IP addresses designated as e.g. 210.10.10.100.

It is noted that the examples shown in FIG. 8 are merely illustrative and are not intended to be limiting. Other architectures and configurations are envisioned by the disclosure. In particular, any number and type of application servers and any number and type of data base servers may be implemented.

Figure 9:
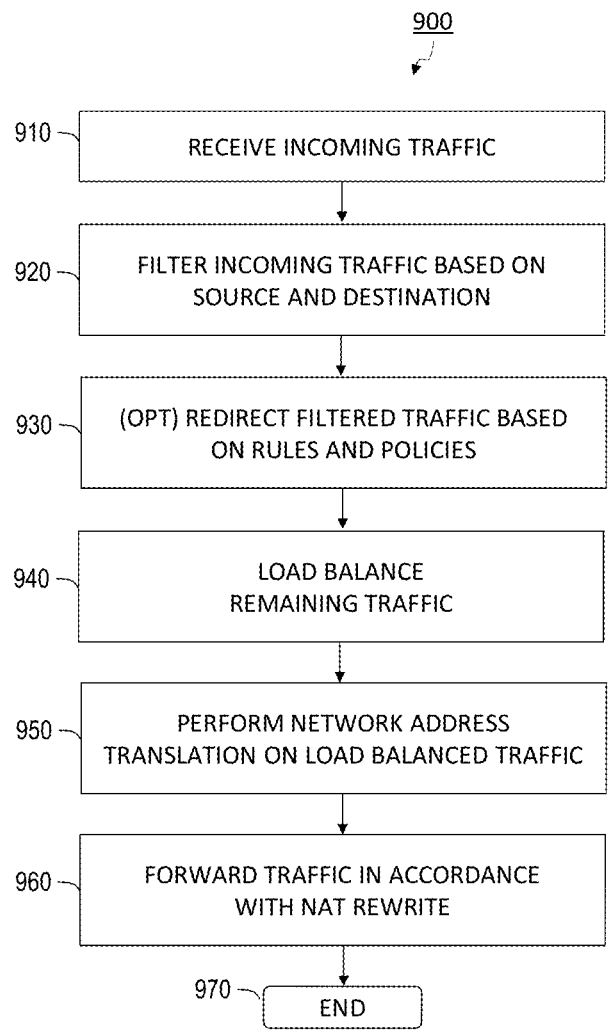
FIG. 9 is a flowchart of an example multifunctional switching method according to some exemplary embodiments of the present specification.

Load-balancing switch 190, especially in context of a network environment as shown in FIG. 8, may be configured to provide both traditional switching services and load-balancing services as well as other functionalities implemented native on the switch. FIG. 9 is a flowchart of an example multifunctional switching method according to one or more examples of the present specification. This method discloses switch 190 being a traffic filter, load balancer, and network address translator.

In block 910, switch 190 receives incoming traffic and provides the incoming traffic to multifunctional engine 320.

In block 920, multifunctional engine 320 filters the received traffic. Filtering may include two phases, performed in any order. In one phase, multifunctional engine 320 compares the source IP address of the incoming traffic to one or more IP addresses configured as certain allowed, predefined sources. To that end, in an embodiment, multifunctional engine 320 may be configured with an access control list (ACL) defining a match (i.e. certain source IP addresses) and an action (e.g. permit or deny traffic). In another phase, multifunctional engine 320 compares the destination IP of the incoming traffic to the VIP 820. When an incoming packet matches at least one ACL rule and there is a match between the destination IP of the incoming traffic and the VIP 820, the multifunctional engine 320 may be configured to infer that the packet is to be handled further by multifunctional engine 320 as illustrates in blocks 930-960. If there is no match in at least one of these phases, then multifunctional engine 320 may discard traffic, not take any further actions on traffic, or simply route or switch the traffic according to its normal function.

In block 930, multifunctional engine 320 may, optionally, apply one or more policies or rules to at least some of the packets that passed the filtering of block 920 to determine whether those packets belong to one or more groups, e.g. device groups described herein and then perform one or more actions based on the device group(s) to which each packet is determined to belong. For example, in block 930, multifunctional engine 320 may group clients, i.e. group requests coming from predefined source IP addresses as specified by certain policies/rules, cache requests e.g. on a per-group basis, and then redirect the cached requests to one or more cache engines to determine whether the cached requests may be satisfied based on data in the one or more cache engines prior to forwarding the requests to the backend database servers 830. Doing so may provide the advantage of reduced time in satisfying requests because it may be much faster to access data from cache engines than the backend nodes.

In block 940, multifunctional engine 320 performs load balancing on the remaining traffic, i.e. incoming traffic that passed the filtering of block 920 and that was not satisfied by redirecting to other engines if redirection of block 930 was performed. Native load balancing of block 940 may be performed in any of the manners described herein, which descriptions, therefore, are not repeated here. As a result of performing load balancing, multifunctional engine 320 assigns each packet to a bucket associated with the best available node, e.g. one of the nodes 830-1 through 830-4 shown in FIG. 8.

In block 950, according to the load balancing decisions of block 940, multifunctional engine 320 performs network address translation for the packets by rewriting the VIP address of the VIP 820 with an IP address of the backend node selected to serve the packet, i.e. IP address of one of the nodes 830-1 through 830-4 shown in FIG. 8.

In block 960, after multifunctional engine 320 has rewritten the header of the packet to an IP address of an appropriate node, switch 190 forwards the incoming traffic to the node designated by the IP address.

Optionally and not shown in FIG. 9, multifunctional engine 320 may log the transaction, as appropriate or necessary.

In block 970, the method is done.

FIG. 10A is an example command-line interface for defining ACL on the switch 190 for the scenario of FIG. 8, according to some exemplary embodiments of the present disclosure. The "permit" commands shown in FIG. 10A instruct multifunctional engine 320 to permit traffic from the source nodes 810-1 and 810-2 identified by their IP addresses 10.10.10.10 and 10.10.10.20, respectively.

FIG. 10B is an example command-line interface for applying the ACL on an interface for the scenario of FIG. 8, according to some exemplary embodiments of the present disclosure. The commands shown in FIG. 10B effectively activate the ACL defined in FIG. 10A.

FIG. 10C is an example command-line interface for defining a device group for the scenario of FIG. 8, according to some exemplary embodiments of the present disclosure. The "node ip" commands shown in FIG. 10C instruct multifunctional engine 320 to assign destination nodes 830-1 through 830-4 identified by their IP addresses 20.20.20.2, 20.20.20.3, 20.20.20.4, and 20.20.20.5, respectively, to a device group called "DB-SERVERS" (database servers). The "probe icmp" command, which is an optional command illustrated in FIG. 10C, configures an Internet Control Message Protocol (ICMP) for the nodes of the device group DB-SERVERS. In this manner, multifunctional switch 190 may be configured to send, e.g. periodically, the ICMP probe to the nodes of this device group, to monitor health of nodes of the device group and to determine their operational status.

FIG. 10D is an example command-line interface for defining load distribution service and specifying VIP NAT policy for the scenario of FIG. 8, according to some exemplary embodiments of the present disclosure. The "ingress interface" command shown in FIG. 10D defines e3/1 interface as the ingress interface for switch 190. The "device-group" command shown in FIG. 10D specifies the previously defined device group DB-SERVERS as the group of backend nodes to which traffic will be load balanced and NAT translated. The "virtual ip" command shown in FIG. 10D enables the VIP 820 to advertise VIP to neighbor routers, so traffic destined to VIP can reach the switch. The "nat destination" command shown in FIG. 10D instructs multifunctional engine 320 to perform network address translation as described in block 950.

By way of example, there is disclosed a computing apparatus for providing multifunctional switching, the apparatus including a switching network; one or more logic elements operable for providing network switching or routing; and one or more logic elements comprising a multifunctional switching engine operable for filtering at least some incoming traffic to select network packets originating from one or more predefined sources and destined to a predefined destination; load balancing at least some of the selected network packets among a plurality of server nodes to assign each network packet to one server node of the plurality of server nodes; for each network packet assigned to one server node of the plurality of server nodes, replacing a destination address of the predefined destination with a destination address of the assigned server node; and forwarding the each network packet assigned to one server node in accordance with the replaced destination address in the network packet There is further disclosed an example, wherein the multifunctional switching engine is further operable for, prior to performing the load balancing, applying one or more policies or rules to at least some of the selected network packets to determine, for each network packet to which the one or more policies or rules are applied, whether the network packet belongs to one or more groups; and performing one or more actions on the network packet, the one or more actions being associated with the one or more groups to which the network packet is determined to belong.

There is further disclosed an example, wherein the one or more actions include redirecting the network packet to a cache engine.

There is further disclosed an example, wherein the multifunctional switching engine is further operable for excluding the network packet redirected to the cache engine from the load balancing and from the forwarding to one of the plurality of server nodes when a request contained in the redirected network packet is satisfied by the cache engine.

There is further disclosed an example, wherein at least part of the filtering is performed using an access control list.

There is further disclosed an example, wherein the computing apparatus further includes a user interface for enabling a user to configure the filtering or/and the load balancing.

There is further disclosed an example, wherein the user interface includes a command line interface.

There is further disclosed by way of example, a computer-implemented method of providing multifunctional switching, the method including filtering at least some incoming traffic to select network packets originating from one or more predefined sources and destined to a predefined destination; load balancing at least some of the selected network packets among a plurality of server nodes to assign each network packet to one server node of the plurality of server nodes; for each network packet assigned to one server node of the plurality of server nodes, replacing a destination address of the predefined destination with a destination address of the assigned server node; and forwarding the each network packet assigned to one server node in accordance with the replaced destination address in the network packet.

There is further disclosed an example, wherein the method further includes, prior to performing the load balancing, applying one or more policies or rules to at least some of the selected network packets to determine, for each network packet to which the one or more policies or rules are applied, whether the network packet belongs to one or more groups; and performing one or more actions on the network packet, the one or more actions being associated with the one or more groups to which the network packet is determined to belong.

There is further disclosed an example, wherein the one or more actions comprise redirecting the network packet to a cache engine.

There is further disclosed an example, wherein the method further includes excluding the network packet redirected to the cache engine from the load balancing and from the forwarding to one of the plurality of server nodes when a request contained in the redirected network packet is satisfied by the cache engine.

There is further disclosed an example, wherein at least part of the filtering is performed using an access control list.

There is further disclosed an example of one or more tangible non-transitory computer-readable storage mediums having stored thereon executable instructions for providing an engine or for performing a method as disclosed in any of the preceding examples.

There is further disclosed an example of a method comprising any or all of the operations as disclosed in any of the preceding examples.

There is further disclosed an apparatus comprising means for implementing any of the preceding examples.

There is further disclosed an example wherein the means comprise a computing system.

There is further disclosed an example wherein the means comprise a processor and a memory.

There is further disclosed an example wherein the means comprise a programmable hardware device such as an ASIC or FPGA.

Note that in this Specification, references to various features (e.g., elements, structures, modules, components, steps, operations, characteristics, etc.) included in "one embodiment", "example embodiment", "an embodiment", "another embodiment", "some embodiments", "various embodiments", "other embodiments", "alternative embodiment", and the like are intended to mean that any such features are included in one or more embodiments of the present disclosure, but may or may not necessarily be combined in the same embodiments. Furthermore, the words "optimize," "optimization," and related terms are terms of art that refer to improvements in speed and/or efficiency of a specified outcome and do not purport to indicate that a process for achieving the specified outcome has achieved, or is capable of achieving, an "optimal" or perfectly speedy/perfectly efficient state.

In example implementations, at least some portions of the activities outlined herein may be implemented in software in, for example, provisioned in service appliance 224 and/or switch 190 (e.g., through various modules, algorithms, processes, etc.). In some embodiments, one or more of these features may be implemented in hardware, provided external to these elements, or consolidated in any appropriate manner to achieve the intended functionality. Service appliance 224 and/or switch 190 may include software (or reciprocating software) that can coordinate in order to achieve the operations as outlined herein. In still other embodiments, these elements may include any suitable algorithms, hardware, software, components, modules, interfaces, or objects that facilitate the operations thereof.

Furthermore, switch 190 and service appliance 224 described and shown herein (and/or their associated structures) may also include suitable interfaces for receiving, transmitting, and/or otherwise communicating data or information in a network environment. Additionally, some of the processors and memories associated with the various network elements may be removed, or otherwise consolidated such that a single processor and a single memory location are responsible for certain activities. In a general sense, the arrangements depicted in the FIGURES may be more logical in their representations, whereas a physical architecture may include various permutations, combinations, and/or hybrids of these elements. It is imperative to note that countless possible design configurations can be used to achieve the operational objectives outlined here. Accordingly, the associated infrastructure has a myriad of substitute arrangements, design choices, device possibilities, hardware configurations, software implementations, equipment options, etc.

In some of example embodiments, one or more memories (e.g., memory 392, memory 388) can store data used for the operations described herein. This includes the memory being able to store instructions (e.g., as part of logic, software, code, etc.) that are executed to carry out the activities described in this Specification. A processor can execute any type of instructions associated with the data to achieve the operations detailed herein in this Specification. In one example, processors 386 and processor 390 could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an erasable programmable read only memory (EPROM), an electrically erasable programmable read only memory (EEPROM)), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof.

In operation, components in network infrastructure 200 can include one or more memory elements (e.g., memory 388, memory 392) for storing information to be used in achieving operations as outlined herein. These devices may further keep information in any suitable type of non-transitory storage medium (e.g., random access memory (RAM), read only memory (ROM), field programmable gate array (FPGA), erasable programmable read only memory (EPROM), electrically erasable programmable ROM (EEPROM), etc.), software, hardware, or in any other suitable component, device, element, or object where appropriate and based on particular needs. The information being tracked, sent, received, or stored in network infrastructure 200 could be provided in any database, register, table, cache, queue, control list, or storage structure, based on particular needs and implementations, all of which could be referenced in any suitable timeframe. Any of the memory items discussed herein should be construed as being encompassed within the broad term 'memory.' Similarly, any of the potential processing elements, modules, and machines described in this Specification should be construed as being encompassed within the broad term 'processor.'

It is also important to note that the operations and steps described with reference to the preceding FIGURES illustrate only some of the possible scenarios that may be executed by, or within, the system. Some of these operations may be deleted or removed where appropriate, or these steps may be modified or changed considerably without departing from the scope of the discussed concepts. In addition, the timing of these operations may be altered considerably and still achieve the results taught in this disclosure. The preceding operational flows have been offered for purposes of example and discussion. Substantial flexibility is provided by the system in that any suitable arrangements, chronologies, configurations, and timing mechanisms may be provided without departing from the teachings of the discussed concepts.

Although the present disclosure has been described in detail with reference to particular arrangements and configurations, these example configurations and arrangements may be changed significantly without departing from the scope of the present disclosure. For example, although the present disclosure has been described with reference to particular communication exchanges involving certain network access, formatting, and protocols, network infrastructure 200 may be applicable to other exchanges, formats, or routing protocols. Moreover, although network infrastructure 200 has been illustrated with reference to particular elements and operations that facilitate the communication process, these elements, and operations may be replaced by any suitable architecture or process that achieves the intended functionality of network infrastructure 200.

Computer program logic implementing all or part of the functionality described herein is embodied in various forms, including, but in no way limited to, a source code form, a computer executable form, and various intermediate forms (for example, forms generated by an assembler, compiler, linker, or locator). In an example, source code includes a series of computer program instructions implemented in various programming languages, such as an object code, an assembly language, or a high-level language such as OpenCL, Fortran, C, C++, JAVA, or HTML for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

In one example embodiment, any number of electrical circuits of the FIGURES may be implemented on a board of an associated electronic device. The board can be a general circuit board that can hold various components of the internal electronic system of the electronic device and, further, provide connectors for other peripherals. More specifically, the board can provide the electrical connections by which the other components of the system can communicate electrically. Any suitable processors (inclusive of digital signal processors, microprocessors, supporting chipsets, etc.), memory elements, etc. can be suitably coupled to the board based on particular configuration needs, processing demands, computer designs, etc. Other components such as external storage, additional sensors, controllers for audio/video display, and peripheral devices may be attached to the board as plug-in cards, via cables, or integrated into the board itself. In another example embodiment, the electrical circuits of the FIGURES may be implemented as stand-alone modules (e.g., a device with associated components and circuitry configured to perform a specific application or function) or implemented as plug-in modules into application specific hardware of electronic devices.

Note that with the numerous examples provided herein, interaction may be described in terms of two, three, four, or more electrical components. However, this has been done for purposes of clarity and example only. It should be appreciated that the system can be consolidated in any suitable manner. Along similar design alternatives, any of the illustrated components, modules, and elements of the FIGURES may be combined in various possible configurations, all of which are clearly within the broad scope of this Specification. In certain cases, it may be easier to describe one or more of the functionalities of a given set of flows by only referencing a limited number of electrical elements. It should be appreciated that the electrical circuits of the FIGURES and its teachings are readily scalable and can accommodate a large number of components, as well as more complicated/sophisticated arrangements and configurations. Accordingly, the examples provided should not limit the scope or inhibit the broad teachings of the electrical circuits as potentially applied to a myriad of other architectures.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "steps for" are specifically used in the particular claims; and (b) does not intend, by any statement in the specification, to limit this disclosure in any way that is not otherwise reflected in the appended claims.

Although the claims are presented in single dependency format in the style used before the USPTO, it should be understood that any claim can depend on and be combined with any preceding claim of the same type unless that is clearly technically infeasible.

What is claimed is:

1. A system for providing multifunctional switching, comprising:
   at least one memory configured to store computer executable instructions, and at least one processor communicatively coupled to the at least one memory and, when executing the instructions, operable for:
- filtering at least some incoming traffic to select network packets originating from one or more predefined sources and destined to a predefined destination, wherein filtering further comprises:
  - comparing a source Internet Protocol (IP) address of the incoming traffic to one or more allowed IP addresses using an access control list (ACL) that defines a match between the source IP address and the one or more allowed IP addresses and a corresponding action; and
  - comparing a destination IP address of the incoming traffic to a virtual IP address, such that selected network packets are packets that match at least one ACL rule and the destination IP address matches the virtual IP address;
- comparing a destination IP address of the selected network packets with a virtual IP address designated for load balancing, and when the destination IP address of the selected network packets does not match the virtual IP address designated for load balancing, the at least one processor is operable for forwarding the selected network packets to the destination IP address, and when the destination IP address of the selected network packets matches the virtual IP address designated for load balancing, the at least one processor is further operable for:
- load balancing at least some of the selected network packets among a plurality of server nodes to assign each network packet to one server node of the plurality of server nodes;
- for each network packet assigned to one server node of the plurality of server nodes, replacing a destination address of the predefined destination with a destination address of the assigned server node; and
- forwarding the each network packet assigned to one server node in accordance with the replaced destination address in the network packet.

2. The system according to claim 1, wherein the at least one processor is further operable for:
- prior to performing the load balancing, applying one or more policies or rules to at least some of the selected network packets to determine, for each network packet to which the one or more policies or rules are applied, whether the network packet belongs to one or more groups; and
- performing one or more actions on the network packet, the one or more actions being associated with the one or more groups to which the network packet is determined to belong.

3. The system according to claim 2, wherein the one or more actions comprise redirecting the network packet to a cache engine.

4. The system according to claim 3, wherein the at least one processor is further operable for:
- excluding the network packet redirected to the cache engine from the load balancing and from the forwarding to one of the plurality of server nodes when a request contained in the redirected network packet is satisfied by the cache engine.

5. The system according to claim 1, further comprising a user interface for enabling a user to configure the filtering or/and the load balancing.

6. The system according to claim 5, wherein the user interface includes a command line interface.

7. The system according to claim 1, wherein the selected network packets are uniquely identified by a tuple comprising a source IP address, a destination IP address, a layer 4 source port, and a layer 4 destination port.

8. A computing apparatus for providing multifunctional switching, comprising:
- a switching network; and
- a multifunctional switching engine operable for:
  - filtering at least some incoming traffic to select network packets originating from one or more predefined sources and destined to a predefined destination, wherein filtering further comprises:
    - comparing a source Internet Protocol (IP) address of the incoming traffic to one or more allowed IP addresses using an access control list (ACL) that defines a match between the source IP address and the one or more allowed IP addresses and a corresponding action; and
    - comparing a destination IP address of the incoming traffic to a virtual IP address, such that selected network packets are packets that match at least one ACL rule and the destination IP address matches the virtual IP address;
  - comparing a destination IP address of the selected network packets with a virtual IP address designated for load balancing, and when the destination IP address of the selected network packets does not match the virtual IP address designated for the load balancing, forwarding the selected network packets to the destination IP address, and when the destination IP address of the selected network packets matches the virtual IP address designated for load balancing:
  - load balancing at least some of the selected network packets among a plurality of server nodes to assign each network packet to one server node of the plurality of server nodes;
  - for each network packet assigned to one server node of the plurality of server nodes, replacing a destination address of the predefined destination with a destination address of the assigned server node; and
  - forwarding the each network packet assigned to one server node in accordance with the replaced destination address in the network packet.

9. The computing apparatus according to claim 8, wherein the multifunctional switching engine is further operable for:
- prior to performing the load balancing, applying one or more policies or rules to at least some of the selected network packets to determine, for each network packet to which the one or more policies or rules are applied, whether the network packet belongs to one or more groups; and
- performing one or more actions on the network packet, the one or more actions being associated with the one or more groups to which the network packet is determined to belong.

10. The computing apparatus according to claim 9, wherein the one or more actions comprise redirecting the network packet to a cache engine.

11. The computing apparatus according to claim 10, wherein the multifunctional switching engine is further operable for:
- excluding the network packet redirected to the cache engine from the load balancing and from the forwarding to one of the plurality of server nodes when a request contained in the redirected network packet is satisfied by the cache engine.

12. The computing apparatus according to claim 8, further comprising a user interface for enabling a user to configure the filtering or/and the load balancing.

13. The computing apparatus according to claim 12, wherein the user interface includes a command line interface.

14. The computing apparatus of claim 8, wherein the selected network packets are uniquely identified by a tuple comprising a source IP address, a destination IP address, a layer 4 source port, and a layer 4 destination port.

15. One or more tangible, non-transitory computer-readable storage mediums having stored thereon executable instructions for providing a multifunctional switching engine, operable for:
    filtering at least some incoming traffic to select network packets originating from one or more predefined sources and destined to a predefined destination, wherein filtering further comprises:
        comparing a source Internet Protocol (IP) address of the incoming traffic to one or more allowed IP addresses using an access control list (ACL) that defines a match between the source IP address and the one or more allowed IP addresses and a corresponding action; and
        comparing a destination IP address of the incoming traffic to a virtual IP address, such that selected network packets are packets that match at least one ACL rule and the destination IP address matches the virtual IP address;
    comparing a destination Internet Protocol (IP) address of the selected network packets with a virtual IP address designated for load balancing, and when the destination IP address of the selected network packets does not match the virtual IP address, designated for load balancing, forwarding the selected network packets to the destination IP address, and when the destination IP address of the selected network packets matches the virtual IP address designated for loading balancing:
    load balancing at least some of the selected network packets among a plurality of server nodes to assign each network packet to one server node of the plurality of server nodes;
    for each network packet assigned to one server node of the plurality of server nodes, replacing a destination address of the predefined destination with a destination address of the assigned server node; and
    forwarding the each network packet assigned to one server node in accordance with the replaced destination address in the network packet.

16. The one or more tangible, non-transitory computer-readable storage mediums according to claim 15, wherein the executable instructions are further operable for:
    prior to performing the load balancing, applying one or more policies or rules to at least some of the selected network packets to determine, for each network packet to which the one or more policies or rules are applied, whether the network packet belongs to one or more groups; and
    performing one or more actions on the network packet, the one or more actions being associated with the one or more groups to which the network packet is determined to belong.

17. The one or more tangible, non-transitory computer-readable storage mediums according to claim 16, wherein the one or more actions comprise redirecting the network packet to a cache engine.

18. The one or more tangible, non-transitory computer-readable storage mediums according to claim 17, wherein the executable instructions are further operable for:
    excluding the network packet redirected to the cache engine from the load balancing and from the forwarding to one of the plurality of server nodes when a request contained in the redirected network packet is satisfied by the cache engine.

19. The one or more tangible, non-transitory computer-readable storage mediums according to claim 15, wherein the executable instructions are further operable for generating a user interface for enabling a user to configure the filtering or/and the load balancing.

20. The one or more tangible, non-transitory computer-readable storage mediums according to claim 19, wherein the user interface includes a command line interface.

* * * * *